United States Patent
Aman et al.

(10) Patent No.: US 8,008,221 B2
(45) Date of Patent: Aug. 30, 2011

(54) DIELECTRIC CERAMIC COMPOSITION AND ELECTRIC DEVICE

(75) Inventors: Sanshiro Aman, Tokyo (JP); Mari Miyauchi, Tokyo (JP); Hideaki Seki, Tokyo (JP)

(73) Assignee: TDK Corporation, Tokyo (JP)

( * ) Notice: Subject to any disclaimer, the term of this patent is extended or adjusted under 35 U.S.C. 154(b) by 328 days.

(21) Appl. No.: 12/314,144

(22) Filed: Dec. 4, 2008

(65) Prior Publication Data
US 2009/0149312 A1    Jun. 11, 2009

(30) Foreign Application Priority Data
Dec. 11, 2007   (JP) ................................. 2007-319812

(51) Int. Cl.
*C04B 35/00* (2006.01)
*B32B 9/00* (2006.01)
*B32B 19/00* (2006.01)
*H01G 4/06* (2006.01)

(52) U.S. Cl. ........ 501/137; 428/471; 428/701; 428/702; 361/321.4; 361/321.5

(58) Field of Classification Search .................. 501/134, 501/135, 136, 137, 138, 139; 428/404, 469, 428/471, 701, 702; 361/321.4, 321.5
See application file for complete search history.

(56) References Cited

U.S. PATENT DOCUMENTS

| | | | | |
|---|---|---|---|---|
| 3,969,252 | A | * | 7/1976 | Utsumi et al. ................. 501/137 |
| 5,319,517 | A | * | 6/1994 | Nomura et al. ............ 361/321.4 |
| 5,757,610 | A | * | 5/1998 | Wada et al. ..................... 361/311 |
| 7,790,645 | B2 | * | 9/2010 | Seki et al. ....................... 501/139 |
| 2007/0284792 | A1 | * | 12/2007 | Yanagida et al. ............. 264/614 |
| 2008/0297979 | A1 | * | 12/2008 | Aman et al. ............... 361/321.5 |

FOREIGN PATENT DOCUMENTS

| JP | B2-3567759 | 9/2004 |
|---|---|---|
| JP | A-2006-321670 | 11/2006 |

* cited by examiner

*Primary Examiner* — Jerry A Lorengo
*Assistant Examiner* — Noah Wiese
(74) *Attorney, Agent, or Firm* — Oliff & Berridge, PLC

(57) ABSTRACT

A dielectric ceramic composition of the present invention comprises; $Ba_mTiO_{2+m}$ (note that, m is $0.99 \leq m \leq 1.01$), and $Ba_nZrO_{2+n}$ (note that, n is $0.99 \leq n \leq 1.01$); wherein said dielectric ceramic composition consists of plurality of dielectric particles and a grain boundary phase existing between said dielectric particles adjacent to each other, when said dielectric particle having $Ba_mTiO_{2+m}$ as a main component is set to a first dielectric particle, said dielectric particle having $Ba_nZrO_{2+n}$ as a main component is set to a second dielectric particle, an average crystal diameter of said first dielectric particle is set to D1 (μm), and an average crystal diameter of said second dielectric particle is set to D2 (μm), then a ratio (D2/D1) of said D2 with respect to said D1 is 0.04 to 0.33, said D2 is 0.02 to 0.25 μm, and in said dielectric ceramic composition a ratio of the total number of said second dielectric particle with respect to the total number of said first dielectric particle is 0.10 to 2. The present invention is to provide the dielectric ceramic composition suitable for the medium-high voltage application used at a high rated voltage (for example, 100V or more).

6 Claims, 4 Drawing Sheets

Mapping analysis of the Zr element of sample number 8 (comparative example)

Reflection electron image of sample number 8 (comparative example)

DIELECTRIC CERAMIC COMPOSITION AND ELECTRIC DEVICE

BACKGROUND OF THE INVENTION

1. Field of the Invention

The present invention relates to a dielectric ceramic composition having a reduction resistance, and an electric device comprising said dielectric ceramic compositions in dielectric layer. Further specifically, the present invention relates to the dielectric ceramic composition and the electronic device suitable for the medium-high voltage application used at a high rated voltage (for example, 100 V or more).

2. Description of the Related Art

A multilayer ceramic capacitor as an example of the electronic device is produced, for example, by alternately stacking a ceramic green sheet comprised of a predetermined dielectric ceramic composition and an internal electrode layer having a predetermined pattern, then co-firing the green chip thus obtained as one body. Since internal electrode layers of the multilayer ceramic capacitor are formed to be one body with ceramic dielectric by firing, materials not reacting with the ceramic dielectric has to be selected. Therefore, in the related art, it has been necessary to use expensive precious metals, such as platinum and palladium, as the material composing the internal electrode layer.

In recent years, however, dielectric ceramic composition using inexpensive base metals, such as nickel and copper, have been developed and a drastic reduction of costs has been realized.

On the other hand, demands for downsizing of electronic devices have increased along with electronic circuits to have higher in density, and multilayer ceramic capacitors have rapidly become downsized with a larger capacity. Along with that, each layer of the dielectric layer of the multilayer ceramic capacitor has become thinner, thus there are demands for the dielectric ceramic composition which can maintain the reliability as a capacitor even when it is made thinner. Especially for the capacitor for the medium-high voltage application used at a high rated voltage (for example, at 100 V or more), extremely high reliability is demanded for the dielectric ceramic composition constituting the dielectric layer.

In response to this demand, for example, Japanese Patent No. 3567759 discloses a dielectric ceramic compositions for the capacitor used under high frequency/high voltage comprised of; main component expressed by composition formula: $ABO_3+aR+bM$ (note that, $ABO_3$ is a solid solution of barium titanate type, an oxide of R (a metal element such as La or so), and an oxide of M (a metal element such as Mn or so)), and the subcomponent comprising a sintering aid comprised of at least one from B element and Si element. Moreover, this Japanese Patent No. 3567759 describes the addition of $XZrO_3$ (note that, X is at least one metal element selected from Ba, Sr, and Ca) as an additive component of the main component in the range of 0.35 mole or less with respect to 1 mole of solid solution of barium titanate expressed by $ABO_3$ of the main component.

Also, Japanese Unexamined Patent No. 2006-321670 discloses the dielectric ceramic composition comprising $BaTiO_3$ and $BaZrO_3$ as a main component in which a ratio of said compound is 8:2 to 6:4, while comprising 3 to 12 mol % of rare earth element, 0.5 to 3.5 mol % of Mn and 1 to 7 mol % of Mg.

However, this, Japanese Patent No. 3567759 had a problem that the voltage resistance (the breakdown voltage) was low and the lifetime characteristics (the accelerated lifetime of the insulation resistance) was insufficient, thus had less reliability. Since, such problem was prominent especially when the multilayer ceramic capacitor was downsized and the capacity was enlarged, improvement of the voltage resistance and the lifetime characteristics (the accelerated lifetime of the insulation resistance) were demanded in order to achieve down sizing and the capacity enlargement. Note that, Japanese Unexamined Patent No. 2006-321670 has no description regarding the voltage resistance (breakdown voltage) of the multilayer ceramic capacitor, and did not solve such problems.

SUMMARY OF THE INVENTION

The present invention has been achieved reflecting such situations, and the object of the present invention is to provide; a dielectric ceramic composition capable of firing in the reduced atmosphere, low in the electrostriction when the voltage is applied, and capable of improving the voltage resistance (breakdown voltage) while maintaining the specific permittivity and the capacitance-temperature characteristic in good condition; and the electronic device comprising this dielectric ceramic composition as a dielectric layer.

As a result of the keen examination, the present inventors has discovered that the voltage resistance (breakdown voltage) can be improved while maintaining the specific permittivity and the capacitance-temperature characteristic or so of various characteristics in good condition, when the particle of barium zirconate as a main component exist in certain condition, with respect to the particle of barium titanate as main component.

That is, a dielectric ceramic composition of the present invention comprises;
$Ba_mTiO_{2+m}$ (note that, m is $0.99 \leq m \leq 1.01$), and
$Ba_nZrO_{2+n}$ (note that, n is $0.99 \leq n \leq 1.01$); wherein
said dielectric ceramic composition comprises plurality of dielectric particles and a grain boundary phase which is present between said dielectric particles adjacent to each other,
when said dielectric particle having $Ba_mTiO_{2+m}$ as a main component is defined as a first dielectric particle, said dielectric particle having $Ba_nZrO_{2+n}$ as a main component is defined as a second dielectric particle, an average crystal diameter of said first dielectric particle is defined as D1 (μm), and an average crystal diameter of said second dielectric particle is defined D2 (μm), then a ratio (D2/D1) of said D2 with respect to said D1 is 0.04 to 0.33, said D2 is 0.02 to 0.25 μm; and
in said dielectric ceramic composition, a ratio of the total number of said second dielectric particle with respect to the total number of said first dielectric particle is 0.10 to 2.

Preferably $Ba_nZrO_{2+n}$ is solid dissolved in said first dielectric particle.

Preferably, said second dielectric particles present near the grain boundary phase existing between said first dielectric particles.

Preferably, the ratio of said $Ba_nZrO_{2+n}$ with respect to 100 moles of said $Ba_mTiO_{2+m}$ is 35 to 65 moles in terms of $Ba_nZrO_{2+n}$.

Preferably, said dielectric ceramic composition further comprises an oxide of Mg, an oxide of R (note that, R is at least one selected from Sc, Y, La, Ce, Pr, Nd, Pm, Sm, Eu, Gd, Tb, Dy, Ho, Er, Tm, Yb, and Lu), an oxide of at least one selected from Mn, Cr, Co, and Fe, and an oxide of at least one selected from Si, Li, Al, Ge, and B; wherein
a ratio of the oxide of each component in terms of oxide or composite oxide with respect to 100 moles of $Ba_mTiO_{2+m}$ are,} the oxide of Mg: 4 to 12 moles,
the oxide of R: 4 to 15 moles,
the oxide of Mn, Cr, Co and Fe: 0.5 to 3 moles, and
the oxide of Si, Li, Al, Ge and B: 3 to 9 moles.

According to the present invention, the electronic device comprising the dielectric layer and an internal electrode layer, in which the dielectric layer is comprised of any one of the above dielectric ceramic composition will be provided.

An electronic device according to the present invention is not particularly limited, however, a multilayer ceramic capacitor, a piezoelectric element, a chip inductor, chip varistor, a chip thermistor, a chip resistor, a chip type surface mount electronic device (SMD) may be mentioned as examples.

In the present invention, the first dielectric particle having $Ba_mTiO_{2+m}$ as the main component and the second dielectric particle having $Ba_nZrO_{2+n}$ as the main component exist under above specific condition. That is, by controlling the condition for existence (the size and the ratio or so) of the second dielectric particle with respect to the existence of the first dielectric particle, the voltage resistance (breakdown voltage) can be improved while maintaining the specific permittivity, the capacitance-temperature characteristic in good condition and maintaining the electrostriction in good condition when the voltage is applied.

Therefore, by adopting the dielectric ceramic composition of the present invention as the dielectric layer of the electronic device such as a multilayer ceramic capacitor, for example, it is possible to attain high reliability even when the dielectric layer is made as thin as 20 μm or so, and when it is used for medium-high voltage application which has a high rated voltage (for example, 100 V or higher, especially 250 V or higher). That is, the present invention can provide an electronic device which is downsized and having higher capacity, and moreover it enables to provide an electronic device used at medium-high voltage having high reliability.

Such electronic device of the present invention can suitably used in, for example, a various automobile related application (an ECM (engine electronic computer module), a fuel injection device, an electronic regulated throttle, an inverter, a converter, a HID lamp, a battery control unit of the hybrid engine or so), or a digital still camera application.

BRIEF DESCRIPTION OF THE DRAWINGS

Hereinafter, the present invention will be explained based on the embodiments shown in the figures.

DESCRIPTION OF THE PREFERRED
EMBODIMENTS

Multilayer Ceramic Capacitor 1

Figure 1:
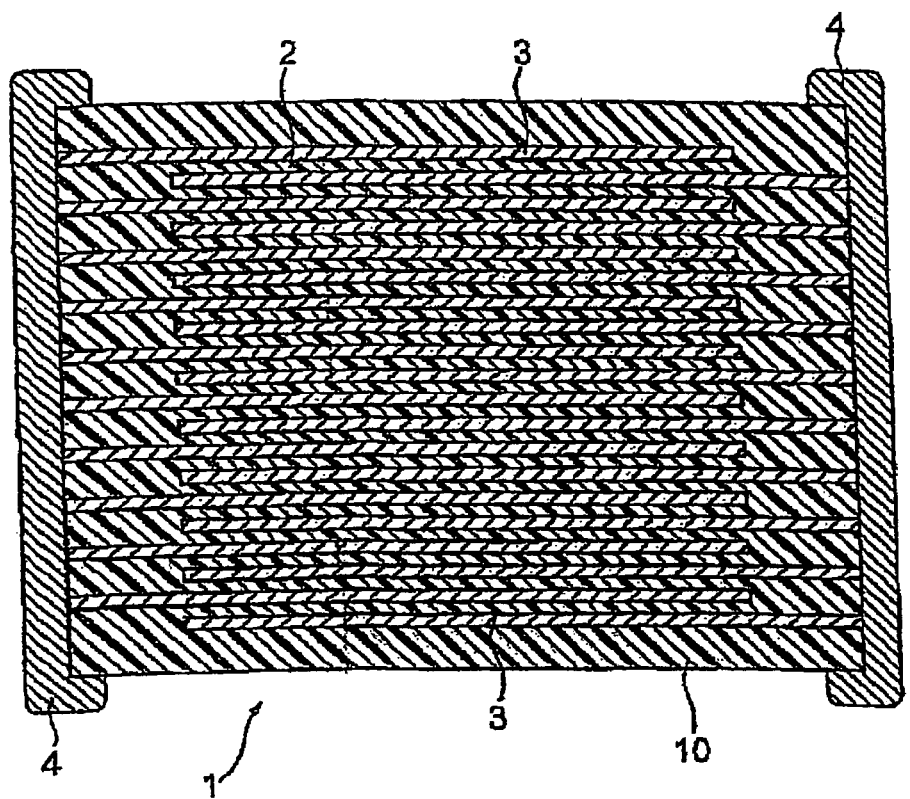
FIG. 1 is a cross sectional view of the multilayer ceramic capacitor according to an embodiment of the present invention.

As shown in FIG. 1, a multilayer ceramic capacitor 1 according to an embodiment of the present invention comprises a capacitor element body 10 in which a dielectric layer 2 and an internal electrode layer 3 are stacked in alternating manner. At the both side ends of this capacitor element body 10, a pair of external electrode 4, which connects with each internal electrode alternately placed in the capacitor element body 10, is formed. Although, the shape of the capacitor element body 10 is not particularly limited, normally, it is in rectangular parallelepiped shape, and the dimension can be suitably changed depending on the use.

The internal electrode layers 3 are stacked so that each end face is alternately exposed to surfaces of the two opposed end portions of the capacitor device body 10. Also, the pair of external electrode 4 is formed at both end portions of the capacitor device body 10, and connected with the exposed end faces of the alternately-stacked internal electrode layers 3 to form a capacitor circuit.

Dielectric Layer 2

The dielectric layer 2 comprises a dielectric ceramic composition of the present invention. The dielectric ceramic composition of the present invention at least comprises;
$Ba_mTiO_{2+m}$ (note that, m is $0.99 \leq m \leq 1.01$), and
$Ba_nZrO_{2+n}$ (note that, n is $0.99 \leq n \leq 1.01$). Here, the amount of oxygen (O) can be slightly deviate from the above stoichiometric constitution.

$Ba_mTiO_{2+m}$ posses a strong dielectric property, and it exhibits a high specific permittivity. "m" in the $Ba_mTiO_{2+m}$ is $0.99 \leq m \leq 1.01$. $Ba_mTiO_{2+m}$ is comprised in the dielectric ceramic composition mainly as a base material.

The content of $Ba_nZrO_{2+n}$ in terms of $Ba_nZrO_{2+n}$ is 35 to 65 moles, preferably 40 to 55 moles, and more preferably 40 to 50 moles, with respect to 100 moles of $Ba_mTiO_{2+m}$. Furthermore, "n" in $Ba_nZrO_{2+n}$ is $0.99 \leq n \leq 1.01$. By adding $Ba_nZrO_{2+n}$ in the above range, the capacitance-temperature characteristic and the voltage resistance can be improved. If the content of $Ba_nZrO_{2+n}$ is too little, in addition to the lowering of the capacitance-temperature characteristic and the voltage resistance, the lifetime characteristics tends to deteriorate as well. On the other hand, if it is too much, the specific permittivity tends to decline. Note that, the content of $Ba_nZrO_{2+n}$ after the sintering can be determined by detecting the Zr element.

The dielectric ceramic composition of the present embodiment preferably further comprises the oxide of R. The content of the oxide of R in terms of $R_2O_3$ is 4 to 15 moles, and preferably 6 to 12 moles with respect to 100 moles of $Ba_mTiO_{2+m}$. The oxide of R posses an effect mainly to suppress the strong dielectric property of $Ba_mTiO_{2+m}$. If the content of the oxide of R is too little, the voltage resistance tends to decline, and also the electrostriction tends to become large when the voltage is applied. On the other hand, if it is too much, the specific permittivity tends to decline. Note that, R element constituting oxide of said R is at least one element selected from Sc, Y, La, Ce, Pr, Nd, Pm, Sm, Eu, Gd, Tb, Dy, Ho, Er, Tm, Yb, and Lu; preferably Gb, Y, Tb, and Gd is particularly preferred.

The dielectric ceramic composition of the present embodiment further preferably comprises the oxide of Mg. The content of the oxide of Mg in terms of MgO is preferably 4 to 12 moles, and more preferably 6 to 10 moles with respect to 100 moles of $Ba_mTiO_{2+m}$. The oxide of Mg has an effect to suppress the strong dielectric property of $Ba_mTiO_{2+m}$. If the content of the oxide of Mg is too little, in addition to the lowering of the capacitance-temperature characteristic and the voltage resistance, the electrostriction tends to become large when the voltage is applied. On the other hand, if it is too much, in addition to the decline of the specific permittivity, the lifetime characteristics and the voltage resistance tends to deteriorate.

The dielectric ceramic composition of the present embodiment preferably further comprises an oxide of at least one selected from Mn, Cr, Co, and Fe. These contents in terms of MnO, $Cr_2O_3$, $Co_3O_4$, and $Fe_2O_3$ are preferably 0.5 to 3 moles, and more preferably 0.5 to 2.5 moles with respect to 100 moles of $Ba_mTiO_{2+m}$. If the contents of the oxides are too little, the lifetime characteristic tends to deteriorate. On the other hand, if too much, in addition to the decline of the specific permittivity, the capacitance-temperature characteristic tends to deteriorate.

The dielectric ceramic composition of the present embodiment preferably further comprises an oxide of at least one selected from Si, Li, Al, Ge and B. These contents in terms of $SiO_2$, $Li_2O$, $Al_2O_3$, $GeO_2$ or $B_2O_3$ are preferably 3 to 9 moles, and more preferably 4 to 8 moles with respect to 100 moles of $Ba_mTiO_{2+m}$. If the content of the oxide are too little, in addition to the decline of the specific permittivity, the lifetime characteristics deteriorates. On the other hand, if too much, the capacitance-temperature characteristic deteriorates. Note that, among said oxides, the oxide of Si is preferably used since the improvement effects of the characteristics are significant.

Note that, in the present description, each oxide or the composite oxide constituting each composition is expressed in stoichiometric component. However the oxidation state of each oxide or the composite oxide may deviate from the stoichiometric constitution. Note that, said ratio of the each component is calculated by converting from the metal content comprised in the oxide or the composite oxide constituting each component to the oxide or the composite oxide of said stoichiometric constitution.

Figure 2:
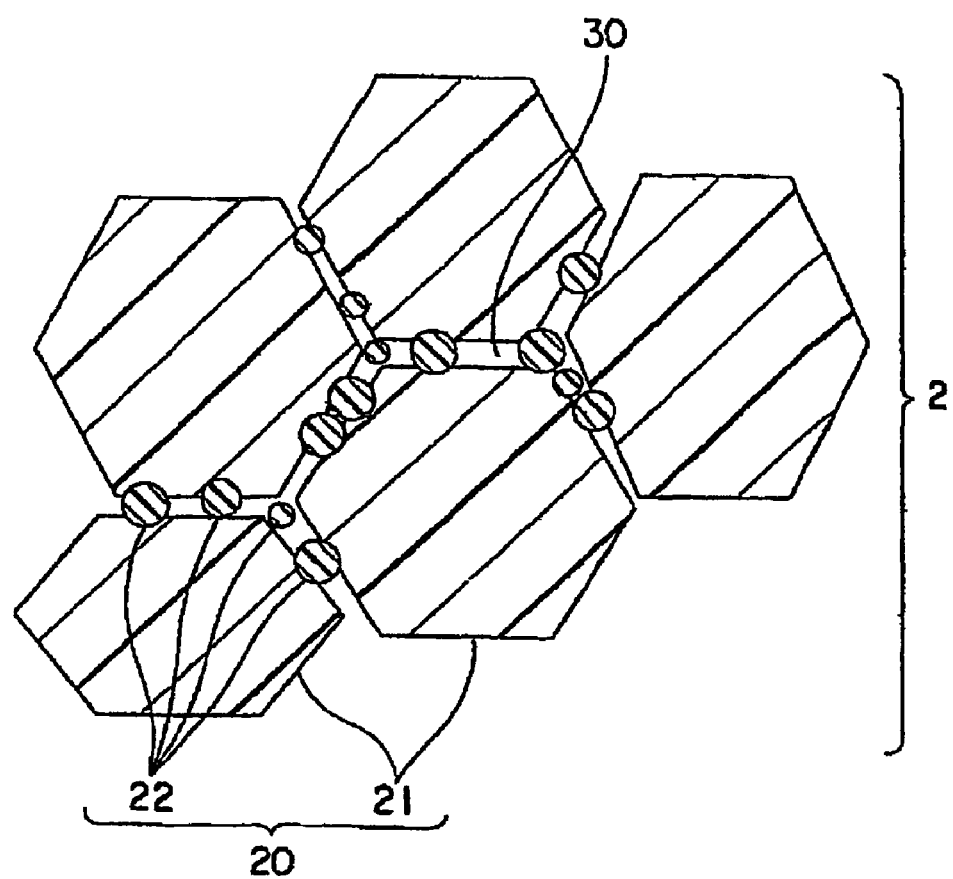
FIG. 2 is a schematic diagram of the dielectric particle and the grain boundary phase of an embodiment of the present invention.

In the present invention, the dielectric layer 2, as shown in FIG. 2, comprises plurality of dielectric particles 20 and the grain boundary phase 30 existing between the dielectric particles adjacent to each other. Furthermore, the dielectric particles 20 at least comprise the first dielectric particle 21 having $Ba_mTiO_{2+m}$ as the main component and the second dielectric particle 22 having $Ba_nZrO_{2+n}$ as the main component. By taking such constitution, in addition to the fact that the number of the grain boundary has increased, due to the structure that the second dielectric particle having high voltage resistance exist, and since the grain boundary of particles having different composition has high voltage resistance, the voltage resistance (breakdown voltage) can be improved. Note that, the dielectric particles besides the first dielectric particle 21 and the second dielectric particle 22 have been omitted from FIG. 2.

In the present embodiment, it is preferable that the first dielectric particle 21 comprises 50 mol % or more of $Ba_mTiO_{2+m}$ as the main component. Also, in the first dielectric particle 21, it is preferable that $Ba_nZrO_{2+n}$ is solid dissolved in $Ba_mTiO_{2+m}$, and other component (such as the oxide of R, the oxide of Mg or so) may be solid dissolved as well. The voltage resistance (breakdown voltage) can be further improved by solid dissolving $Ba_nZrO_{2+n}$ in the first dielectric particle 21, and by having the second dielectric particle 22 comprising non solid dissolved $Ba_nZrO_{2+n}$ as the main component in the first dielectric particle. Note that, it is preferable that the second dielectric particle comprises 65 mol % or more of $Ba_nZrO_{2+n}$, and other component may be solid dissolved as well.

When the average crystal diameter of the first dielectric particle 21 is D1 (μm), and that of the second dielectric particle 22 is D2 (μm), then the ratio of D2 with respect to D1 (D2/D1) is 0.04 to 0.33, preferably 0.1 to 0.31, and more preferably 0.15 to 0.29. That is, the second dielectric particle 22 has relatively small average crystal diameter compared to the first dielectric particle 21. If (D2/D1) is too small, then the capacitance-temperature characteristic tends to deteriorate, and if too large, then the voltage resistance tends to decline.

Also, the average crystal diameter D2 of the second dielectric particle 22 is 0.02 to 0.25 μm, preferably 0.08 to 0.2 μm, and more preferably 0.10 to 0.18 μm. If D2 is too small, the capacitance-temperature characteristic tends to deteriorate, and if too large the voltage resistance (breakdown voltage) tend to decline. Note that, D1 is not particularly limited as long as it satisfies the range of (D2/D1), however it is preferably 0.15 to 1.0 μm.

Note that, the average crystal diameter of the dielectric particle 20 (21, 22) is measured as followed. That is, the capacitor body 10 is cut in the stacking direction of the dielectric layer 2 and the internal electrode layer 3, and the average area of the dielectric particle was measured by observing the cross section using transmission electron microscope (TEM). Then, from obtained average area, the diameter is calculated assuming the area as a circle and the crystal diameter is the diameter multiplied by 1.5. 200 or more of the dielectric particles are measured and the value which the accumulation from the cumulative frequency distribution of the obtained diameter is 50% is considered as the average crystal diameter (unit: μm).

Also, in the present invention, among the dielectric particle 20, the ratio of the total number of the second dielectric particle 22 with respect to the total number of the first dielectric particle 21 is 0.10 to 2, preferably 0.10 to 1.80, and more preferably 0.12 to 1.60. If the ratio of the total number of the second dielectric particle 22 with respect to the total number of the first dielectric particle 21 is too small, then the voltage resistance (breakdown voltage) tends to decline; and if too large, then the capacitance-temperature characteristic tends to deteriorate.

As for the method to obtain the above ratio, for example, the following method may be mentioned in the present embodiment. In the reflection electron image observed in the cross section of the dielectric layer 2 by TEM, the second dielectric particle 22 is observed in a different contrast from the first dielectric particle 21, thus the first dielectric particle 21 and the second dielectric particle 22 can be identified, and thereby the total number can be calculated. At the same time, by further analyzing the composition of the observed dielectric particle 20, the first dielectric particle 21 and the second dielectric particle 22 can be identified further accurately. Then, the ratio of the total number of the second dielectric particle 22 with respect to the first dielectric particle 21 is determined from the calculated number of the first dielectric particle 21 and the second dielectric particle 22.

The position of the second dielectric particle 22 in the dielectric ceramic composition is not particularly limited in the present invention; however, the second dielectric particle 22 preferably exist near the grain boundary phase 30 which exist between the first dielectric particle 21 and the second dielectric particle 22. Although this is not necessarily assured, this is because the breakdown process is thought to be moderated, due to the suppression of the intensity of the electric field towards the first dielectric particle 21 having relatively low voltage resistance.

Note that, the "near the grain boundary phase" does not only refer to the area of the grain boundary phase, but also includes the area where the first dielectric particle 21 contacts with the grain boundary phase. In many cases, the thickness of the grain boundary phase 30 present between the first dielectric particles 21 is smaller than the average crystal diameter D2 of the second dielectric particle 22. Therefore, the second dielectric particle 22 does not only exist in the grain boundary phase existing between the first dielectric particles 21, but also exist such that it connects to the first dielectric particle 21.

The thickness of the dielectric layer 2 is not particularly limited, and it may be determined according to the use of the multilayer ceramic capacitor 1.

Internal Electrode Layer 3

The conducting material comprised in the internal electrode layer 3 are not particularly limited, however, since the material constituting the dielectric layer 2 has reduction resistance, fairly inexpensive base metals can be used. The base metals to be used as the conducting materials are preferably, Ni or Ni alloy. As for the Ni alloy, the alloy made of Ni and one or more elements selected from Mn, Cr, Co, and Al is preferable, and the content of the Ni in the alloy is preferably 95 wt % or more. Note that, Ni or the Ni alloy may contain 0.1 wt % or less or so of various trace component such as P or so. Furthermore, the internal electrode layer 3 may be formed by using the commercially available electrode paste. The thickness of the internal electrode layer 3 may be determined accordingly depending on the use or so.

External Electrode 4

The conducting material comprised in the external electrode 4 is not particularly limited; however, inexpensive Ni, Cu, or the alloy thereof may be used in the present invention. The thickness of the external electrode layer 4 can be determined accordingly depending on the use or so.

The Production Method of the Multilayer Capacitor 1

The multilayer ceramic capacitor 1 of the present embodiment is produced by making the green chip by the standard printing method or the sheets method using the paste by firing, followed by firing this to print or transfer the external electrodes. The following will explain the production method in detail.

First, a dielectric material (a dielectric ceramic composition powder) comprised in the dielectric layer paste is prepared, and made into a paste to prepare the dielectric layer paste. The dielectric layer paste may be an organic paste kneaded with dielectric material and the organic vehicle, or it may be a water-based paste.

As for the dielectric materials, the oxide of the above each component, the mixture thereof, or the composite oxide can be used. However, other various compounds which become the above oxide or the composite oxide as a result of firing can be used, for example, they can be suitably selected from the carbonate, the oxalate, the nitrate, the hydroxide, or the organic metal composite, etc and then mixed to be used. For example, as for the material of $Ba_mTiO_{2+m}$, $Ba_mTiO_{2+m}$ may be used, or $BaCO_3$ and $TiO_2$ may be used as well. Moreover, as for the material of $Ba_nZrO_{2+n}$, $Ba_nZrO_{2+n}$ may be used, or $BaCO_3$ and $ZrO_2$ may be used as well. The content of the each compound in the dielectric material is determined so that the constitution of the above dielectric ceramic composition after the firing is obtained. The particle size of the dielectric material is normally, average diameter of 0.1 to 1 μm or so before made into paste.

In the present embodiment, among the material of above each component, as for at least a part of the material other than $Ba_mTiO_{2+m}$, each oxide or the composite oxide, or the compound which becomes each oxide or the composite oxide after the firing may be used as it is; or it may be calcined to be used as calcined powder. Alternatively, as for a part of the material other than $Ba_nZrO_{2+n}$, it may be calcined together with $BaTiO_{2+m}$. However, if $Ba_nZrO_{2+n}$ is calcined together with $Ba_mTiO_{2+m}$, the effect of the present invention becomes difficult to attain, thus the calcination of such combination are not preferred. Also, when calcinating, it is preferably performed at 800 to 1100° C.

Also, the materials other than $Ba_mTiO_{2+m}$ may be mixed and partially calcined to obtain partially calcined powder. The temperature of the partial calcine is preferably similar temperature range of above calcination temperature.

The material of $Ba_mTiO_{2+m}$ preferably having an average particle diameter of 0.2 to 1 μm is preferably used. Also, the other materials such as $Ba_nZrO_{2+n}$ having the average particle diameter 0.2 to 1 μm are preferably used. Note that, even when calcinating or partially calcinating said materials to make a calcined powder or partially calcined powder, it is preferable to set the average particle diameter within said range. In the present embodiment, the existence ratio or the crystal diameter of the second dielectric particle can be controlled by controlling the firing conditions such as the holding temperature and the holding time or so at the calcination or partial calcination; or by the combination of the calcined or partial calcined subcomponents of the calcination or the partial calcination.

The organic vehicle is obtained by dissolving a binder in an organic solvent. The binder used in the organic vehicle is not particularly limited, and may be properly selected from a variety of usual binders such as ethylcellulose and polyvinyl butyral or so. Also, the organic solvent used is not particularly limited, and may be properly selected from a variety of organic solvents such as terpineol, butyl carbitol, acetone and toluene or so in accordance with the method being used such as a printing method and sheet method.

Also, when using water-based dielectric layer paste, dielectric materials can be kneaded with a water-based vehicle obtained by dissolving an aqueous binder and dispersant, etc., in water. The aqueous binder used for water-based vehicle is not particularly limited, and for example, polyvinyl alcohol, cellulose, aqueous acrylic resin, and etc., may be used.

An internal electrode layer paste is obtained by kneading conducting materials consisting of the above mentioned various conducting metals and alloys, or various oxides, organic metallic compound and resinate, etc., which become the above-mentioned conducting materials after firing, with the above-mentioned organic vehicle.

The external electrode paste may be obtained as same as the above-mentioned internal electrode layer paste.

The content of organic vehicle in each of the above-mentioned paste is not particularly limited, and may be usual content, for example, 1 to 5 wt % or so of the binder and 10 to 50 wt % or so of the solvent. Also, in each paste, there may include additives selected from a variety of dispersants, plasticizer, dielectrics, insulators, etc., if needed. The total contents of these are preferably 10 wt % or less.

When using the printing method, the dielectric layer paste and the internal electrode layer paste are printed on a substrate such as PET or so to form layers, and after cutting to a predetermined shape, a green chip is obtained by removing from the substrate.

Also, when using the sheet method, a green sheet is formed by using dielectric layer paste, the internal electrode layer paste is printed thereon, and then, these are stacked to form a green chip.

Before firing, the green chip is subject to the binder removal treatment. The binder removal conditions include temperature rising rate of preferably 5 to 300° C./hour, holding temperature of preferably 180 to 400° C., and temperature holding time of preferably 0.5 to 24 hours. Also, a firing atmosphere is in air or reduced atmosphere.

The atmosphere at the firing of the green chip can be suitably determined depending on the types of the conducting materials in the internal electrode layer paste. However when using base metals such as Ni or Ni alloy as the conducting material, the oxygen partial pressure of the firing atmosphere is preferably $10^{-14}$ to $10^{-10}$ MPa. If the oxygen partial pressure is below said range, the conducting material of the internal electrode layer may have abnormal sintering which results in a breakage thereof. Also, if the oxygen partial pressure exceeds said range, the internal electrode layer tends to oxidize.

The holding temperature at the firing is preferably 1000 to 1400° C., and more preferably 1100 to 1360° C. If the holding temperature is below said range, the densification becomes insufficient; and if it exceeds said range, the breakage of the electrode due to the abnormal sintering of the internal electrode layer, the deterioration of the capacitance-temperature characteristic due to the dispersion of the constitution material of the internal electrode layer, or a reduction of the dielectric ceramic composition tend to occur.

As for the other firing conditions, the temperature rising rate is preferably 50 to 500° C./hour, and more preferably 200 to 300° C./hour; the temperature holding time is preferably 0.5 to 8 hours, and more preferably 1 to 3 hours; and the cooling rate is preferably 50 to 500° C./hour, and more preferably 200 to 300° C./hour. Also, the firing atmosphere is preferably a reduced atmosphere. As for the atmospheric gas, for example, wet mixed gas of $N_2$ and $H_2$ may be used.

After firing in a reducing atmosphere, it is preferable to anneal the capacitor device body. The annealing is a treatment for reoxidizing the dielectric layer and can make IR lifetime significantly longer, so that the reliability is improved.

The oxygen partial pressure in the annealing atmosphere is preferably $10^{-9}$ to $10^{-5}$ MPa. When the oxygen partial pressure is below the above range, it may be difficult to reoxidize the dielectric layer. When it exceeds the above range, the internal electrode layer tends to be further oxidized.

Holding temperature at annealing is preferably 1100° C. or less, particularly preferably 500 to 1100° C. When the holding temperature is below the above range, the dielectric layer may not be sufficiently oxidized, often resulting in lowering the IR and shortening the high temperature load lifetime. On the other hand, when the holding temperature exceeds the above range, the internal electrode layer is not only oxidized to reduce the capacitance, but also reacts with the dielectric body itself, which may easily cause to deteriorate the capacitance-temperature characteristic, to reduce the IR, and to shorten the high temperature load lifetime. Note that the annealing may consist of a temperature rising process and temperature falling process. Namely, the temperature holding time may be zero. In this case, the holding temperature is same as the maximum temperature.

Additional annealing conditions include: the temperature holding time of preferably 0 to 20 hours, more preferably 2 to 10 hours; and the cooling rate of preferably 50 to 500° C./hour, more preferably 100 to 300° C./hour. Also, the atmosphere gas at annealing is preferably a wet $N_2$ gas, for example.

In the above-mentioned binder removal treatment, firing and annealing, a wetter, etc., may be used to wet the $N_2$ gas and mixed gas, for example. In this case, the water temperature is preferably 5 to 75° C. or so. Also, the binder removal treatment, firing and annealing may be performed continuously or independently.

Thus obtained capacitor device body is then subject to end surface polishing, for example, by barrel-polishing or sand blasting, and the external electrode paste is pasted thereon, followed by firing, so that the external electrode 4 is formed. If needed, a covering layer may be formed on the surface of the external electrode 4 by plating or so.

Thus produced multilayer ceramic capacitor of the present embodiment is mounted on the printed-circuit board, etc., by soldering, etc., to be used in a variety of electronic devices, etc.

Hereinbefore, an embodiment of the present invention is described, but the present invention is not limited to the above-mentioned embodiments and can be variously modified within the scope of the present invention.

For example, in the above-mentioned embodiment, a multilayer ceramic capacitor is exemplified as an electronic device according to the present invention. However, the electronic device according to the present invention is not limited to the multilayer ceramic capacitor and may be any comprising the dielectric layer having the above constitution.

EXAMPLES

Hereinafter, the present invention will be described based on the further detailed examples, but the present invention is not limited to the examples.

Example 1

First, $BaTiO_3$ (m=1.000), $BaZrO_3$ (n=1.000), $Gd_2O_3$, $MgCO_3$, MnO and $SiO_2$ were prepared. Then, $BaZrO_3$, $MgCO_3$, $Gd_2O_3$, MnO and $SiO_2$ were mixed, and the obtained mixed powder was calcined at 1000° C. to prepare the partially calcined powder having average diameter of 0.2 μm. Then, $BaTiO_3$ was added to the obtained partially calcined powder, and wet pulverized for 15 hours in a ball mill, followed by drying to obtain a dielectric material having average particle diameter of 0.3 μm. The amount of each component added was, with respect to 100 moles of $BaTiO_3$, in terms of the oxide or the composite oxide, the added amount of $BaZrO_3$ component was 45 moles, the added amount of $Gd_2O_3$ component was 8.5 moles, the added amount of $MgCO_3$ component was 8 moles, the added amount of MnO component was 1.2 moles, and the added amount of $SiO_2$ component was 5.0 moles.

Note that, $MgCO_3$ will be included in the dielectric ceramic composition as MgO after the firing.

Next, the obtained dielectric material: 100 parts by weight, polyvinyl butyral resin: 10 parts by weight, dioctyl phthalate (DOP) as a plasticizer: 5 parts by weight, and alcohol as a solvent: 100 parts by weight were mixed by a ball mill to form a paste, and the dielectric layer paste was obtained.

Also, aside from the above, Ni particles: 44.6 parts by weight, terpineol: 52 parts by weight, ethyl cellulose: 3 parts by weight and benzotriazole: 0.4 parts by weight were kneaded by triple rolls to slurry, and the internal electrode layer paste was obtained.

Then, by using the above-obtained dielectric layer paste, on a PET film, a green sheet was formed so as to have a thickness of 30 μm after drying. Next, by using the internal electrode layer paste, an electrode layer was printed in a predetermined pattern thereon, followed by removing the sheet from the PET film, and the green sheet having the electrode layer was obtained. A plurality of green sheets having the electrode layer were stacked and adhered by pressure to obtain a green stacking body. The green stacking body was cut in a predetermined size to obtain a green chip.

Then, the obtained green chip was subject to binder removal treatment, firing and annealing in the following conditions, to obtain a multilayer ceramic fired body.

The binder removal treatment was performed at temperature rising rate: 25° C./hour, holding temperature: 260° C., temperature holding time: 8 hours, and atmosphere: in the air.

The firing condition was performed at temperature rising rate: 200° C./hour, holding temperature: 1220 to 1380° C., temperature holding time: 2 hours, cooling rate: 200° C./hour, atmosphere gas: wet mixed gas of $N_2$ and $H_2$ (the oxygen partial pressure: $10^{-12}$ MPa).

The annealing was performed at temperature rising rate: 200° C./hour, holding temperature: 1000 to 1100° C., temperature holding time: 2 hours, cooling rate: 200° C./hour, atmosphere gas: wet gas of $N_2$ (the oxygen partial pressure: $7.5 \times 10^{-8}$ to $2.3 \times 10^{-7}$ MPa). Note that a wetter was used to wet the atmosphere gas during the firing and annealing.

After polishing end faces of the obtained multilayer ceramic fired body with sandblast, In—Ga was coated as an external electrode to obtain a sample of the multilayer ceramic capacitor shown in FIG. 1. In the present example, as shown in Table 1, the plurality of the capacitor samples (samples No. 1 to 21) were made in which comprising the dielectric layer constituted by the dielectric ceramic composition of different composition. The size of the obtained capacitor sample was 3.2 mm×1.6 mm×0.6 mm, the thickness of the dielectric layer was 20 μm, the thickness of the internal electrode layer was 1.5 μm, and the number of the dielectric layers sandwiched by the internal electrode layers was 10.

In regards with the obtained each capacitor sample, the first dielectric particle and the second dielectric particle were observed by the following method, and the average crystal diameter of these dielectric particles were measured. Furthermore, the breakdown voltage (voltage resistance), the capacitance-temperature characteristic (TC), the specific permittivity (∈s), and the electrostriction due to the application of the voltage were measured using the following methods.

The Observation of the First Dielectric Particle and the Second Dielectric Particle First, the obtained sample was cut on the surface vertical to the stacking direction. The first dielectric particle (main component: $BaTiO_3$) and the second dielectric particle (main component: $BaZrO_3$) were identified by; the reflection electron image of said cut surface observed by the transmission electron microscope (TEM), and by the mapping analysis performed using the energy dispersive X-ray spectroscopy attached with the TEM. Then, in regards with the first dielectric particle and the second dielectric particle, assuming that each dielectric particle has spherical shape, the crystal diameters of 400 dielectric particles were measured by code method. The average of the crystal diameter of the measured first dielectric particle was set to the average crystal diameter D1, and the average of the crystal diameter of the measured second dielectric particle was set to the average crystal diameter D2.

The ratio (D2/D1) of D2 with respect to D1 was determined from the obtained D1 and D2. Also, from the obtained first dielectric particle and the second dielectric particle, the ratio of the number of the second dielectric particle with respect to the first dielectric particle was determined. The results are shown in Table 1.

Breakdown Voltage (Voltage Resistance)

A direct voltage was applied to the capacitor samples at the voltage rising rate of 100 V/sec at 25° C. The breakdown voltage is the voltage value (unit: V/μm) with respect to the thickness of the dielectric layer when 10 mA of current flows. By measuring the breakdown voltage, the voltage resistance of the capacitor samples was evaluated. In the present example, the breakdown voltage of 50 V/μm or more was considered good. The results are shown in Table 1.

Capacitance-Temperature Characteristic (TC)

For capacitor samples, by digital LCR meter (4284A by YHP), inputting frequency of 1 kHz and input signal level (measured voltage) of 1 Vrms, capacitance at 125° C. was measured to calculate the changing rate with respect to the capacitance at reference temperature 25° C. In the present example, if it was within the range of ±15%, then it was considered good. The results are shown in Table 1.

Specific Permittivity ∈s

For capacitor samples, by digital LCR meter (4284A by YHP), inputting frequency of 1 kHz and input signal level (measured voltage) of 1 Vrms, capacitance C at 25° C. was measured. Then, specific permittivity ∈s (no unit) was calculated based on the thickness of the dielectric layer, effective electrode area and the capacitance C obtained by the measurement. The higher specific permittivity is more preferable, and in the present example, 250 or more was considered good.

Electrostriction Due to Applied Voltage

First, capacitor sample was mounted to a glass epoxy board, on which a predetermined pattern of electrode was printed, by soldering. Next, to the capacitor sample mounted on the board, voltage was applied under conditions of AC at 10 Vrms/μm and frequency at 3 kHz to measure amplitude of vibration of the capacitor sample surface when applying voltage, which was determined as electrostriction. Note that amplitude of vibration of the capacitor sample surface was measured by laser Doppler vibrometer. Also, in the present example, an average of measurements of 10 capacitor samples was determined as electrostriction. The lower electrostriction is more preferable, and in the present example, less than 10 ppm was considered good. The results are shown in Table 1.

TABLE 1

| Sample number | D2/D1 | (The number of the second dielectric particle)/(the number of the first dielectic particle) | D2 [μm] | Breakdown voltage [V/μm] | TC (125° C.) [%] | ∈s | Amount of electrostriction [ppm] | Firing temp. [° C.] |
|---|---|---|---|---|---|---|---|---|
| *1 | 0.02 | 0.81 | 0.16 | 65 | −18 | 301 | 7 | 1220 |
| 2 | 0.04 | 0.76 | 0.18 | 72 | −15 | 330 | 8 | 1230 |

TABLE 1-continued

| Sample number | D2/D1 | (The number of the second dielectric particle)/(the number of the first dielectric particle) | D2 [μm] | Breakdown voltage [V/μm] | TC (125° C.) [%] | εs | Amount of electrostriction [ppm] | Firing temp. [° C.] |
|---|---|---|---|---|---|---|---|---|
| 3 | 0.11 | 0.84 | 0.2 | 70 | −14 | 298 | 6 | 1240 |
| 4 | 0.20 | 0.66 | 0.16 | 67 | −13 | 312 | 7 | 1260 |
| 5 | 0.28 | 0.69 | 0.17 | 63 | −13 | 328 | 5 | 1270 |
| 6 | 0.33 | 0.83 | 0.19 | 60 | −15 | 289 | 5 | 1280 |
| *7 | 0.40 | 0.84 | 0.18 | 30 | −14 | 302 | 6 | 1300 |
| *8 | 0.21 | 0.05 | 0.21 | 40 | −14 | 304 | 8 | 1300 |
| 9 | 0.18 | 0.10 | 0.19 | 65 | −15 | 299 | 6 | 1280 |
| 10 | 0.17 | 0.46 | 0.18 | 66 | −14 | 306 | 5 | 1270 |
| 11 | 0.22 | 0.82 | 0.2 | 67 | −15 | 311 | 6 | 1260 |
| 12 | 0.23 | 1.48 | 0.17 | 69 | −13 | 315 | 7 | 1250 |
| 13 | 0.19 | 2.00 | 0.19 | 70 | −15 | 319 | 8 | 1240 |
| *14 | 0.17 | 3.00 | 0.18 | 65 | −19 | 300 | 6 | 1220 |
| *15 | 0.18 | 0.67 | 0.01 | 65 | −18 | 308 | 7 | 1220 |
| 16 | 0.24 | 0.87 | 0.02 | 70 | −15 | 294 | 7 | 1230 |
| 17 | 0.22 | 0.82 | 0.08 | 68 | −14 | 295 | 8 | 1240 |
| 18 | 0.18 | 0.78 | 0.14 | 66 | −15 | 305 | 6 | 1250 |
| 19 | 0.19 | 0.76 | 0.2 | 66 | −13 | 310 | 7 | 1260 |
| 20 | 0.22 | 0.88 | 0.25 | 65 | −14 | 318 | 8 | 1280 |
| *21 | 0.23 | 0.68 | 0.3 | 40 | −15 | 324 | 7 | 1300 |

Sample numbers with "*" indicates the sample out of the range of the present invention
With respect to 100 moles of $BaTiO_3$
$BaZrO_3$: 45 moles,
$Gd_2O_3$: 8.5 moles,
MgO: 8.0 moles,
MnO: 1.2 moles,
$SiO_2$: 5.0 moles From Table 1, when the ratio (D2/D1) of the average crystal diameter D2 of the second dielectric particle with respect to the average crystal diameter D1 of the first dielectric particle, the number of the second dielectric particle with respect to the number of the first dielectric particle and D2 are within the range of the present invention (sample number 2 to 6, 9 to 13, and 16 to 20), then the breakdown voltage can be improved while lowering the electrostriction, and maintaining the capacitance-temperature changing rate and the specific permittivity rate in good condition.

On the other hand, when any one of the above is out of the range of the present invention (sample number 1, 7, 8, 14, 15 and 21), then the deterioration of the capacitance-temperature changing rate and the breakdown voltage can be observed.

Figure 3A:
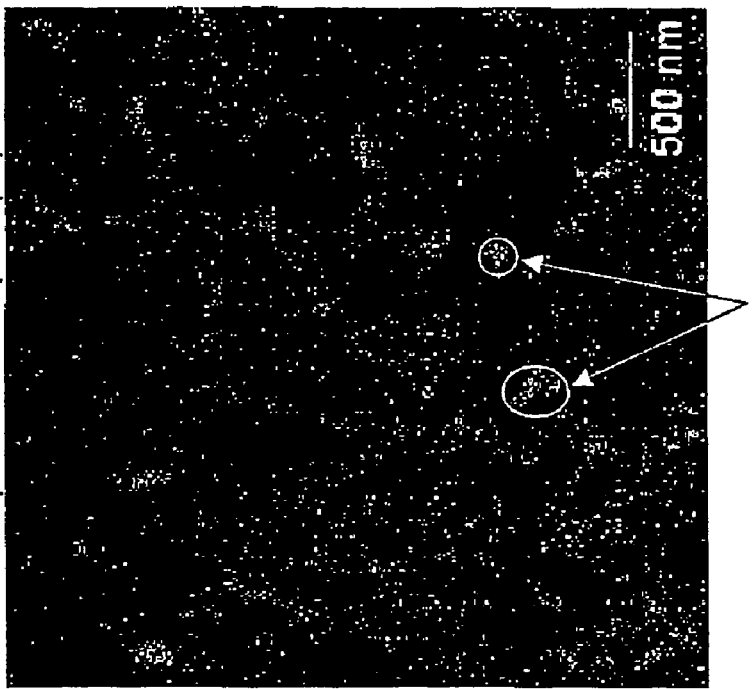
FIG. 3A is a reflection electron image observed by TEM at the cross section of the dielectric layer of the multilayer ceramic capacitor according to the example of the present invention.
Figure 3B:
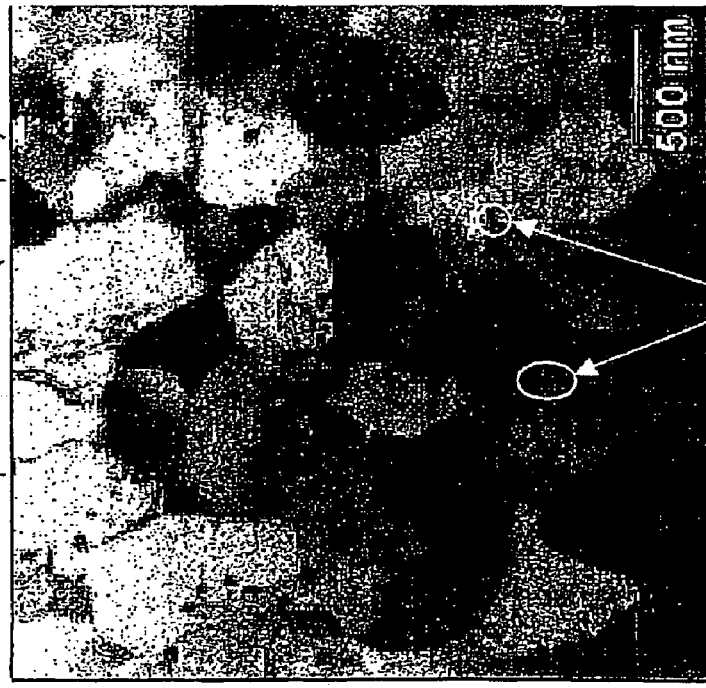
FIG. 3B is a mapping analysis showing the concentration distribution of Zr element at the area of FIG. 3A.

Also, FIG. 3 shows the mapping analysis of the Zr element and the reflection electron image according to the sample number 10 which is an example. As it can be seen from FIGS. 3A and B, the second dielectric particle is smaller than the other dielectric particle (the first dielectric particle), and it is observed as the dielectric particle having a different contrast from the other dielectric particle. The second dielectric particle contains many Zr element. That is, there exist the second dielectric particles comprising many $BaZrO_3$.

Figure 4B:
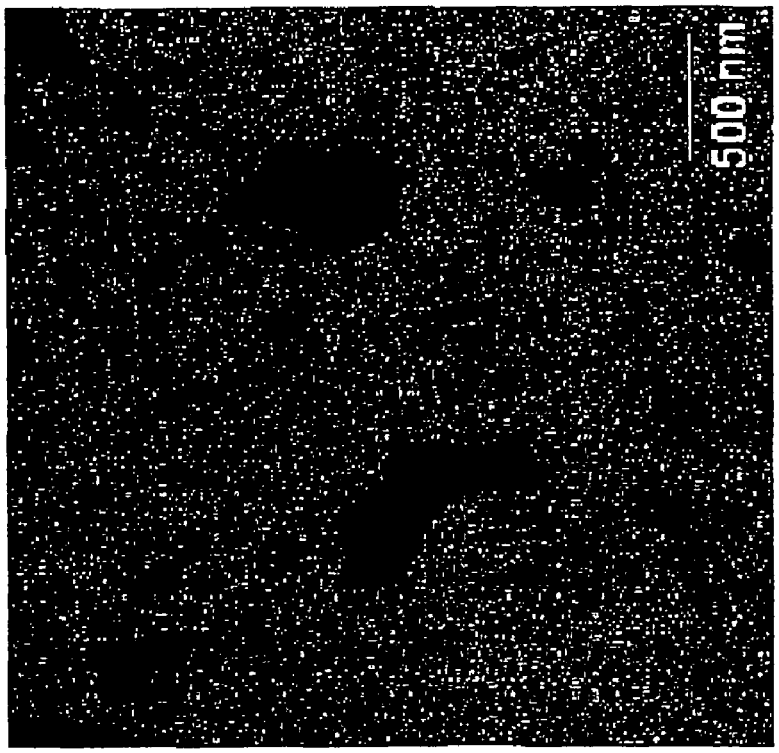
FIG. 4B is a mapping analysis of the concentration distribution of Zr element at the area of FIG. 4A.
Figure 4A:
FIG. 4A is a reflection electron image observed by TEM at the cross section of the dielectric layer of the multilayer ceramic capacitor according to the comparative example of the present invention.

The reflection electron image and the mapping analysis of the Zr element according to the sample number 8 is shown in FIG. 4, which is a comparative example. As it can be seen from FIGS. 4A and B, the second dielectric particle which was observed in FIGS. 3A and B hardly exist therein. Therefore, the effect of the present invention cannot be obtained.

Example 2

The capacitor sample was made and evaluated as same as that of the example 1, except for making the added amount of the $BaZrO_3$ component to 41 moles, the added amount $Gd_2O_3$ component to 6.5 moles, the added amount of $MgCO_3$ component to 8.4 moles, the added amount of MnO component to 1.1 moles, and the added amount of $SiO_2$ component to 4.5 moles, in terms of the composite oxide or each oxides, with respect to 100 moles of $BaTiO_3$. The results are shown in Table 2.

Example 3

The capacitor sample was made and evaluated as same as that of the example 1, except for making the added amount of the $BaZrO_3$ component to 56 moles, the added amount $Gd_2O_3$ component to 10.5 moles, the added amount of $MgCO_3$ component to 7.5 moles, the added amount of MnO component to 1.0 mole, and the added amount of $SiO_2$ component to 5.5 moles, in terms of the composite oxide or each oxides, with respect to 100 moles of $BaTiO_3$. The results are shown in Table 3.

TABLE 2

| Sample number | D2/D1 | (The number of the second dielectric particle)/(the number of the first dielectic particle) | D2 [μm] | Breakdown voltage [V/μm] | TC (125° C.) [%] | εs | Amount of electrostriction [ppm] | Firing temp. [° C.] |
|---|---|---|---|---|---|---|---|---|
| *22 | 0.03 | 0.79 | 0.18 | 64 | −19 | 310 | 8 | 1220 |
| 23 | 0.04 | 0.78 | 0.19 | 71 | −14 | 320 | 8 | 1230 |

TABLE 2-continued

| Sample number | D2/D1 | (The number of the second dielectric particle)/(the number of the first dielectric particle) | D2 [μm] | Breakdown voltage [V/μm] | TC (125° C.) [%] | εs | Amount of electrostriction [ppm] | Firing temp. [° C.] |
|---|---|---|---|---|---|---|---|---|
| 24 | 0.10 | 0.83 | 0.17 | 72 | −14 | 301 | 6 | 1240 |
| 25 | 0.19 | 0.82 | 0.2 | 68 | −14 | 306 | 6 | 1260 |
| 26 | 0.27 | 0.75 | 0.19 | 63 | −13 | 318 | 7 | 1270 |
| 27 | 0.33 | 0.69 | 0.2 | 60 | −13 | 293 | 6 | 1280 |
| *28 | 0.38 | 0.84 | 0.19 | 29 | −14 | 298 | 7 | 1300 |
| *29 | 0.20 | 0.07 | 0.2 | 43 | −15 | 317 | 7 | 1300 |
| 30 | 0.19 | 0.10 | 0.18 | 66 | −14 | 303 | 6 | 1280 |
| 31 | 0.17 | 0.52 | 0.19 | 68 | −13 | 305 | 6 | 1270 |
| 32 | 0.21 | 0.79 | 0.2 | 66 | −13 | 301 | 5 | 1260 |
| 33 | 0.22 | 1.35 | 0.18 | 70 | −14 | 306 | 8 | 1250 |
| 34 | 0.20 | 2.00 | 0.19 | 68 | −15 | 311 | 6 | 1240 |
| *35 | 0.18 | 3.00 | 0.19 | 63 | −18 | 302 | 5 | 1220 |
| *36 | 0.19 | 0.83 | 0.01 | 64 | −17 | 308 | 6 | 1220 |
| 37 | 0.23 | 0.76 | 0.02 | 71 | −15 | 298 | 8 | 1230 |
| 38 | 0.21 | 0.68 | 0.09 | 69 | −13 | 313 | 6 | 1240 |
| 39 | 0.18 | 0.79 | 0.13 | 65 | −14 | 310 | 7 | 1250 |
| 40 | 0.20 | 0.76 | 0.18 | 64 | −13 | 315 | 8 | 1260 |
| 41 | 0.21 | 0.84 | 0.25 | 63 | −14 | 317 | 6 | 1280 |
| *42 | 0.22 | 0.73 | 0.3 | 41 | −14 | 320 | 7 | 1300 |

Sample numbers with "*" indicates the sample out of the range of the present invention
With respect to 100 moles of $BaTiO_3$
$BaZrO_3$: 41 moles,
$Gd_2O_3$: 6.5 moles,
MgO: 8.4 moles,
MnO: 1.1 moles,
$SiO_2$: 4.5 moles

TABLE 3

| sample number | D2/D1 | (The number of the second dielectric particle)/(the number of the first dielectric particle) | D2 [μm] | Breakdown voltage [V/μm] | TC (125° C.) [%] | εs | Amount of electrostriction [ppm] | Firing temp. [° C.] |
|---|---|---|---|---|---|---|---|---|
| *43 | 0.02 | 0.78 | 0.18 | 64 | −18 | 312 | 6 | 1220 |
| 44 | 0.04 | 0.82 | 0.17 | 70 | −14 | 315 | 7 | 1230 |
| 45 | 0.09 | 0.81 | 0.19 | 69 | −14 | 305 | 8 | 1240 |
| 46 | 0.18 | 0.78 | 0.17 | 68 | −13 | 302 | 6 | 1260 |
| 47 | 0.27 | 0.75 | 0.18 | 67 | −14 | 311 | 7 | 1270 |
| 48 | 0.33 | 0.80 | 0.2 | 63 | −13 | 305 | 5 | 1280 |
| *49 | 0.38 | 0.79 | 0.21 | 33 | −15 | 298 | 6 | 1300 |
| *50 | 0.20 | 0.06 | 0.2 | 38 | −13 | 331 | 7 | 1300 |
| 51 | 0.19 | 0.10 | 0.18 | 68 | −14 | 310 | 7 | 1280 |
| 52 | 0.18 | 0.43 | 0.17 | 67 | −15 | 307 | 6 | 1270 |
| 53 | 0.20 | 0.87 | 0.19 | 67 | −14 | 305 | 8 | 1260 |
| 54 | 0.19 | 1.65 | 0.22 | 70 | −15 | 310 | 6 | 1250 |
| 55 | 0.21 | 2.00 | 0.21 | 72 | −14 | 320 | 7 | 1240 |
| *56 | 0.20 | 3.00 | 0.19 | 66 | −18 | 306 | 7 | 1220 |
| *57 | 0.17 | 0.70 | 0.01 | 64 | −17 | 302 | 8 | 1220 |
| 58 | 0.24 | 0.87 | 0.02 | 72 | −14 | 305 | 7 | 1230 |
| 59 | 0.23 | 0.80 | 0.07 | 67 | −13 | 307 | 6 | 1240 |
| 60 | 0.19 | 0.69 | 0.13 | 69 | −14 | 308 | 8 | 1250 |
| 61 | 0.21 | 0.77 | 0.19 | 68 | −14 | 310 | 6 | 1260 |
| 62 | 0.20 | 0.83 | 0.25 | 66 | −15 | 311 | 7 | 1280 |
| *63 | 0.21 | 0.75 | 0.31 | 39 | −14 | 320 | 7 | 1300 |

Sample numbers with "*" indicates the sample out of the range of the present invention
With respect to 100 moles of $BaTiO_3$
$BaZrO_3$: 56 moles,
$Gd_2O_3$: 10.5 moles,
MgO: 7.5 moles,
MnO: 1.0 moles,
$SiO_2$: 5.5 moles From Table 2 and 3, it can be confirmed that even when the added amount of each component is changed, similar tendency to example 1 can be obtained.

What is claimed:

1. A dielectric ceramic composition comprising;
$Ba_mTiO_{2+m}$ where $0.99<m<1.01$, and
$Ba_nZrO_{2+n}$ where $0.99<n<1.01$, wherein
said dielectric ceramic composition comprises plurality of dielectric particles and a grain boundary phase present between said dielectric particles adjacent to each other, when said dielectric particle having $Ba_mTiO_{2+m}$ as a main component is defined as a first dielectric particle and said dielectric particle having $Ba_nZrO_{2+n}$ as a main component is defined as a second dielectric particle, an average crystal diameter of said first dielectric particle is defined as D1 (μm), and an average crystal diameter of said second dielectric particle is defined as D2 (μm), then a ratio (D2/D1) of said D2 with respect to said D1 is 0.04 to 0.33, while said D2 is 0.02 to 0.25 μm, and
in said dielectric ceramic composition a ratio of the total number of said second dielectric particle with respect to the total number of said first dielectric particle is 0.10 to 2.

2. The dielectric ceramic composition as set forth in claim 1, wherein $Ba_nZrO_{2+n}$ is solid dissolved in said first dielectric particle.

3. The dielectric ceramic composition as set forth in claim 1, wherein said second dielectric particle exists near the grain boundary phase present between said first dielectric particle.

4. The dielectric ceramic composition as set forth in claim 1, wherein a ratio of said $Ba_nZrO_{2+n}$ with respect to 100 moles of said $Ba_mTiO_{2+m}$ is, in terms of $Ba_nZrO_{2+n}$, 35 to 65 moles.

5. The dielectric ceramic composition as set forth in claim 1, wherein said dielectric ceramic composition further comprises;
an oxide of Mg, an oxide of R, where R is at least one selected from Sc, Y, La, Ce, Pr, Nd, Pm, Sm, Eu, Gd, Tb, Dy, Ho, Er, Tm, Yb, and Lu, an oxide of at least one selected from Mn, Cr, Co, and Fe, and an oxide of at least one from Si, Li, Al, Ge, and B; wherein
a ratio of the oxide of each component in terms of oxide or composite oxide with respect to 100 moles of $Ba_mTiO_{2+m}$ are,
the oxide of Mg: 4 to 12 moles,
the oxide of R: 4 to 15 moles,
the oxide of Mn, Cr, Co and Fe: 0.5 to 3 moles, and
the oxide of Si, Li, Al, Ge and B: 3 to 9 moles.

6. An electronic device comprising a dielectric layer comprised of the dielectric composition as set forth in claim 1, and an internal electrode layer.

* * * * *